(No Model.)

T. C. H. KRÜGER.
Corn and Cotton Planter.

No. 231,818.          Patented Aug. 31, 1880.

WITNESSES:          INVENTOR:
Henry N. Miller          T. C. H. Krüger
C. Sedgwick          BY Munn & Co
         ATTORNEYS.

UNITED STATES PATENT OFFICE.

THEODORE C. H. KRÜGER, OF SAN MARCOS, TEXAS.

CORN AND COTTON PLANTER.

SPECIFICATION forming part of Letters Patent No. 231,818, dated August 31, 1880.

Application filed May 14, 1880. (No model.)

*To all whom it may concern:*

Be it known that I, THEODORE CHARLES HERMAN KRÜGER, of San Marcos, in the county of Hays and State of Texas, have invented a new and Improved Corn and Cotton Planter, of which the following is a specification.

The objects of my improvements are to produce a machine for planting corn or cotton, that may be attached to almost any kind of plow, simple in construction, easily repaired by an ordinary blacksmith, and capable of use in a satisfactory manner for planting where stumps and rocks would interfere with the operation of machines of ordinary construction.

The means by which I accomplish these objects are illustrated in the accompanying drawings, in which—

Figure 1:
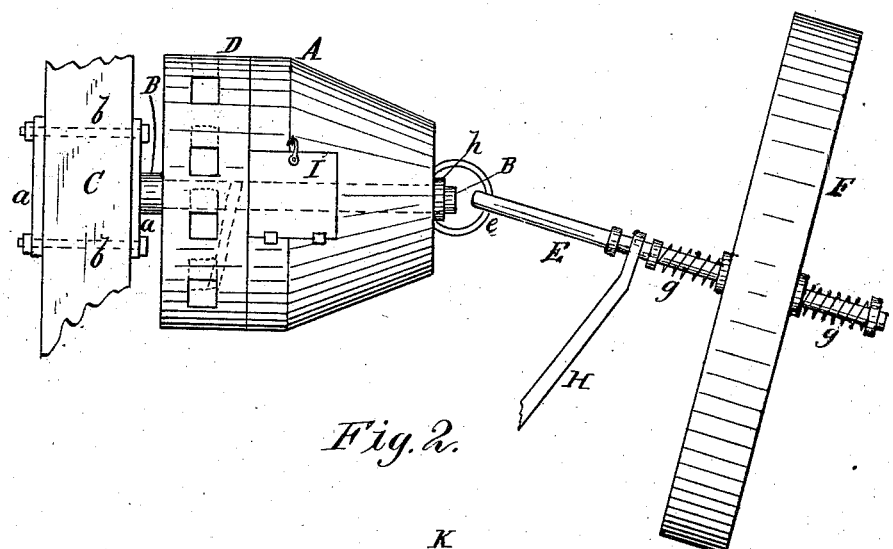
Figure 2:
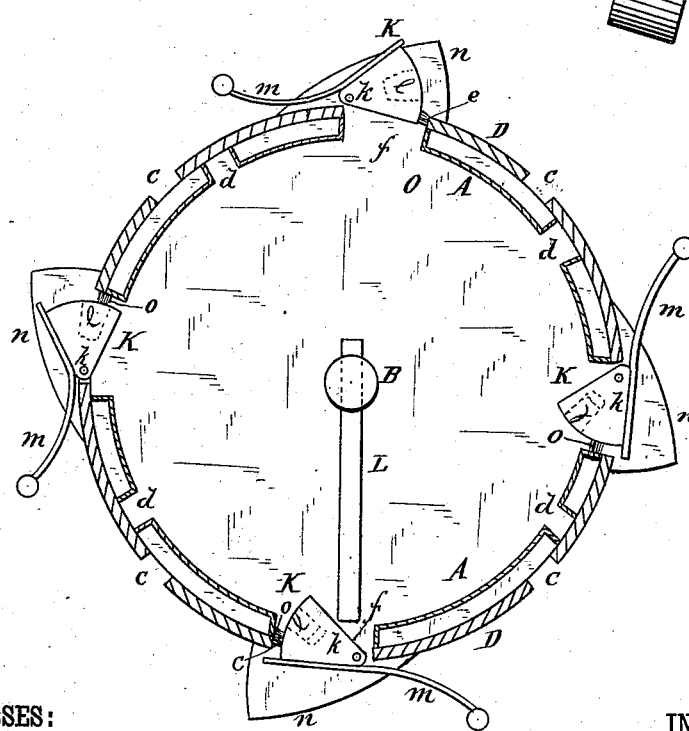

Figure 1 shows an elevation of my planting attachment, a portion only of the plow-beam to which it is secured being shown. Fig. 2 is a vertical cross-section of the seed-drum with the corn-droppers attached.

The same letters of reference are used in all parts of the drawings to refer to the same parts of the machine.

A is the seed-drum, which revolves freely upon the shaft B, which is secured at one end to the plow-beam C by plates $a$ and bolts $b$. The other end of the shaft has a nut, $h$, to hold the drum in place, and is secured by the loose joint or coupling $e$ to the shaft E of the wheel F, by which the seed-drum A is revolved. The loose joint is shown as consisting of a ring attached to the shaft B and passing through an eye or loop on the end of shaft E. On each side of the wheel F are spiral springs $g\,g$, which permit lateral motion of the wheel. By means of the loose shaft-coupling and the spiral springs bearing against the sides of the wheel the latter is free to pass over stumps and rocks and yield to irregularities of the ground without affecting the movements of the plow or seed-drum.

H shows a broken portion of a brace-rod for holding the wheel in line with the plow.

The end of the seed-drum next to the plow is provided with openings $d\,d$ and $f\,f$, and that part of the drum is encircled by a movable head and outer rim, D, having openings $c\,c$ and $e\,e$, corresponding, respectively, to openings $d\,d$ and $f\,f$ of the drum. The openings $e f$ are much larger than the openings $c d$, and when made to register have placed therein the corn-droppers K, as shown in Fig. 2. The droppers K are pivoted, as at $k$, and have at their front ends pockets $l$, for receiving the grain from the inside of the seed-drum. The droppers are provided with the counterweighted arms $m$, for insuring the movement of the droppers K into or out of the seed-drum at proper points of the revolution of the latter.

$n\,n$ are side flanges on the outside of the droppers to prevent the corn from falling as the droppers are moving to the outside of the drum.

L is an arm attached to the shaft B, and depending from the same to nearly the inside wall of the seed-drum, for loosening the grain at the point of its discharge.

$o\,o$ are brushes for assisting the discharge of the grain from the pockets $l\,l$.

To change the machine from a corn to a cotton planter the pivots $k\,k$ are taken out and the droppers K K are removed. The rim D is then moved upon the drum A until the small openings $c$ and $d$ are made to register, and the change is complete.

A door or man-hole, I, is provided in the drum A, for convenience in putting in the seed.

Having thus described my invention, I claim as new and desire to secure by Letters Patent—

1. In combination with the plow-beam C, the shaft B, feed-drum A, shaft E, loose coupling $e$, and wheel F, substantially as and for the purpose described.

2. In combination with the plow-beam C, the shaft B, feed-drum A, shaft E, loose coupling $e$, wheel F, and springs $g\,g$, as and for the purpose described.

3. In combination with the plow-beam C, the shaft B, feed-drum A, shaft E, loose coupling $e$, wheel F, springs $g\,g$, and brace-rod H, as and for the purpose set forth.

4. In combination with the seed-drum A and outer rim, D, the pivoted droppers K, having pockets $l$, substantially as and for the purpose described.

5. In combination with the seed-drum A and outer rim, D, the brushes $o$ and pivoted droppers K, having pockets $l$, substantially as set forth.

THEODORE CHARLES HERMAN KRÜGER.

Witnesses:
JAS. G. BURLESON,
ED. J. L. GREEN.